(12) United States Patent
Nobe (10) Patent No.: US 10,823,363 B2
(45) Date of Patent: Nov. 3, 2020

(54) VEHICULAR LAMP

(71) Applicant: STANLEY ELECTRIC CO., LTD., Tokyo (JP)

(72) Inventor: Kazuki Nobe, Tokyo (JP)

(73) Assignee: STANLEY ELECTRIC CO., LTD., Tokyo (JP)

( * ) Notice: Subject to any disclaimer, the term of this patent is extended or adjusted under 35 U.S.C. 154(b) by 0 days.

(21) Appl. No.: 16/388,325

(22) Filed: Apr. 18, 2019

(65) Prior Publication Data

US 2019/0323675 A1    Oct. 24, 2019

(30) Foreign Application Priority Data

Apr. 19, 2018   (JP) .................................. 2018-080739

(51) Int. Cl.
| | |
|---|---|
| *F21S 43/20* | (2018.01) |
| *F21S 43/14* | (2018.01) |
| *F21S 43/30* | (2018.01) |
| *F21Y 115/10* | (2016.01) |

(52) U.S. Cl.
CPC ............... *F21S 43/26* (2018.01); *F21S 43/14* (2018.01); *F21S 43/30* (2018.01); *F21Y 2115/10* (2016.08)

(58) Field of Classification Search
CPC .. F21S 43/26; F21S 43/14; F21S 43/40; F21S 41/33; F21S 41/337; F21S 41/335
See application file for complete search history.

(56) References Cited

U.S. PATENT DOCUMENTS

| | | | | |
|---|---|---|---|---|
| 4,241,388 A | * | 12/1980 | Green ..................... | F21S 43/40 362/516 |
| 6,382,822 B1 | * | 5/2002 | Maekawa ............... | F21S 41/28 362/522 |
| 2003/0035299 A1 | | 2/2003 | Amano | |
| 2007/0127253 A1 | * | 6/2007 | Kawashima .......... | F21S 41/155 362/509 |
| 2007/0195540 A1 | | 8/2007 | Misawa et al. | |

(Continued)

FOREIGN PATENT DOCUMENTS

| | | |
|---|---|---|
| EP | 1 852 650 A1 | 11/2007 |
| JP | 2003-59313 A | 2/2003 |
| WO | 2016/067175 A1 | 5/2016 |

OTHER PUBLICATIONS

Extended European Search Report for the related European Patent Application No. 19169839.8 dated Oct. 2, 2019.

*Primary Examiner* — Eric T Eide
(74) *Attorney, Agent, or Firm* — Kenealy Vaidya LLP (57) ABSTRACT

A vehicular lamp capable of producing a flow of light emitted laterally and capable of emitting light with good appearance is provided. The vehicle light includes: a light source, a reflector that reflects the light from the light source laterally, and an inner lens that allows the light reflected by the reflector to be projected laterally. The reflector has a reflecting surface on which a plurality of reflection cuts are periodically arranged in a front-rear direction thereof. The inner lens has a lens surface protruded from a surface facing the reflector so as to face the reflecting surface. The lens surface has a shape extending in the front-rear direction while being curved convexly in a vertical direction, and a radius of curvature of the lens surface in the vertical direction gradually increases from a proximal end side to a distal end side of the lens surface.

20 Claims, 6 Drawing Sheets

(56) References Cited

U.S. PATENT DOCUMENTS

| | | | |
|---|---|---|---|
| 2008/0186726 A1* | 8/2008 | Okada | B60Q 1/0041 |
| | | | 362/509 |
| 2009/0027911 A1 | 1/2009 | Misawa et al. | |
| 2009/0201694 A1* | 8/2009 | Okada | F21S 43/14 |
| | | | 362/516 |
| 2011/0103085 A1* | 5/2011 | Kiel | F21S 43/26 |
| | | | 362/519 |
| 2018/0156408 A1* | 6/2018 | Okubo | F21S 41/16 |
| 2018/0290587 A1* | 10/2018 | Fimeri | B60Q 1/2665 |

* cited by examiner

VEHICULAR LAMP

This application claims the priority benefit under 35 U.S.C. § 119 of Japanese Patent Application No. 2018-080739 filed on Apr. 19, 2018, which is hereby incorporated in its entirety by reference.

TECHNICAL FIELD

The presently disclosed subject matter relates to a vehicular lamp.

BACKGROUND ART

Conventionally, there have been provided vehicular lamps mounted on the front or rear of a vehicle, having a light source such as a light emitting diode (LED) and a reflector configured to reflect light emitted from the light source in a lateral direction of the vehicle, as those disclosed in Japanese Patent Application Laid-Open No. 2003-059313 (or U.S. Patent Application Publication No. 2003/0035299A1 corresponding thereto).

Incidentally, various shapes have been developed by diversifying designs in such a vehicular lamp. For example, in daytime lighting lamps (DRL: Daytime Running Lamps) (hereinafter, referred to as DRL), directional indicators (turn signal lamps), vehicle width lamps (position lamps), and the like, designs for vehicular lamps configured to linearly emit light toward the side of the vehicle are increasing.

For example, the foregoing patent literature discloses a vehicular lamp of this type, including a plurality of LED light sources, a plurality of lenses configured to collimate light from each LED light source into parallel light, a reflector configured to reflect the parallel light from each of the lens forward of the vehicular lamp, and a light-transmitting cover provided in front of the reflector. In this vehicular lamp, each lens is arranged so as to align the direction of the parallel light. The reflector is divided into small reflectors for respective regions in each of which the parallel light from each lens enters. The small reflectors are arranged in a stepwise manner so as to be gradually displaced from one end of the reflector to the rear of the lamp in a direction orthogonal to the front-rear direction of the lamp.

Incidentally, almost all the conventional vehicular lamp described above uniformly projects light toward the side of the vehicle. On the other hand, when the light emitted toward the side of the vehicle produces a stream of light (streamlined emission) in which light is projected in a linear (line-shaped) fashion, it is impossible to expect the appearance to have a good impact if the vehicular lamp only uniformly projects light.

SUMMARY

The presently disclosed subject matter was devised in view of these and other problems and features in association with the conventional art. According to an aspect of the presently disclosed subject matter, there can be provided a vehicular lamp capable of producing a flow of light by light emitted toward the side of a vehicle and capable of emitting light with good appearance.

According to further another aspect of the presently disclosed subject matter, a vehicle light can include: a light source configured to emit light; a reflector configured to reflect the light emitted from the light source toward a side of the vehicle (sideward); and an inner lens configured to allow the light reflected by the reflector to be projected toward the side of the vehicle, wherein the reflector has a reflecting surface on which a plurality of reflection cuts are periodically arranged in a front-rear direction of the reflector, the inner lens has a lens surface protruded from a surface facing the reflector so as to face the reflecting surface, the lens surface has a shape extending in the front-rear direction while being curved convexly in a vertical direction, and a radius of curvature of the lens surface in the vertical direction gradually increases from a first end side to a second end side of the lens surface. Herein, the first end side may be a proximal end to the light source while the second end side may be a distal end away from the light source.

In the vehicular lamp according to the foregoing aspect, the radius of curvature of the lens surface in the vertical direction is set so that the light incident from the lens surface is condensed in the vertical direction and then diffused in the vertical direction.

In the vehicular lamp according to any of the foregoing aspects, the degree of diffusion of light diffused in the vertical direction by the lens surface gradually decreases from the first end side to the second end side of the lens surface.

In the vehicular lamp according to any of the foregoing aspects, the inner lens is configured so as to be curved convexly toward the side opposite to the side facing the reflector in the vertical direction, and the lens surface is provided between an upper end and a lower end of the inner lens.

In the vehicular lamp according to any of the foregoing aspects, the reflecting surface is provided so as to be curved convexly toward the side facing the inner lens in the vertical direction.

In the vehicular lamp according to any of the foregoing aspects, the radius of curvature of the reflecting surface in the vertical direction is set so as to reflect light incident on the reflecting surface while collimating the light in the vertical direction.

In the vehicular lamp according to any of the foregoing aspects, the vehicular lamp includes an outer lens configured to allow light to be projected from the inner lens toward the side of the vehicle, and a condensing point of light condensed by the lens surface is located on the inner lens side of a surface of the outer lens opposite to the inner lens side.

In the vehicular lamp according to any of the foregoing aspects, the outer lens is provided so as to be curved convexly toward the side opposite to the side facing the inner lens in the vertical direction.

As described above, according to the presently disclosed subject matter, the vehicular lamp is capable of producing a flow of light by the light projected toward the side of the vehicle and capable of emitting light with good appearance.

BRIEF DESCRIPTION OF DRAWINGS

These and other characteristics, features, and advantages of the presently disclosed subject matter will become clear from the following description with reference to the accompanying drawings, wherein.

DESCRIPTION OF EXEMPLARY EMBODIMENTS

A description will now be made below to vehicular lamps of the presently disclosed subject matter with reference to the accompanying drawings in accordance with exemplary embodiments.

In the drawings used in the following description, in order to make each component easy to understand, the scale of the dimension may be shown differently depending on the component, and the dimensional ratio of each component is not necessarily the same as the actual ratio.

Figure 1:
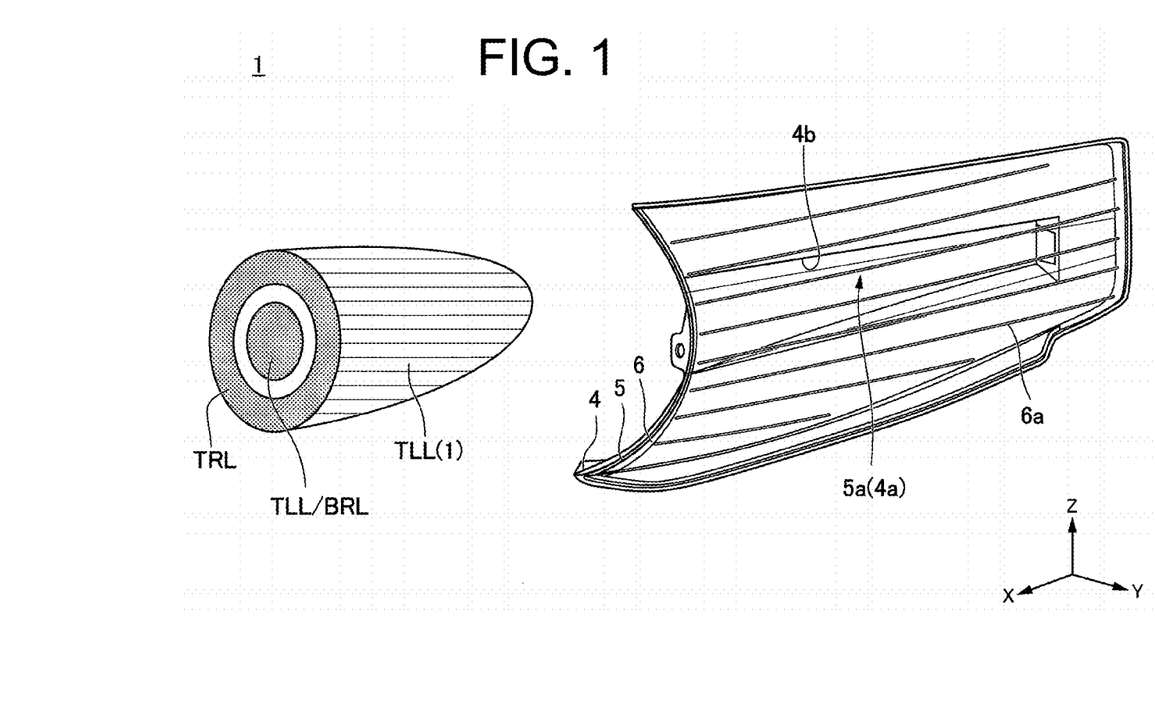
FIG. 1 is a perspective view showing a configuration of a vehicular lamp made in accordance with principles of the presently disclosed subject matter.
Figure 2:
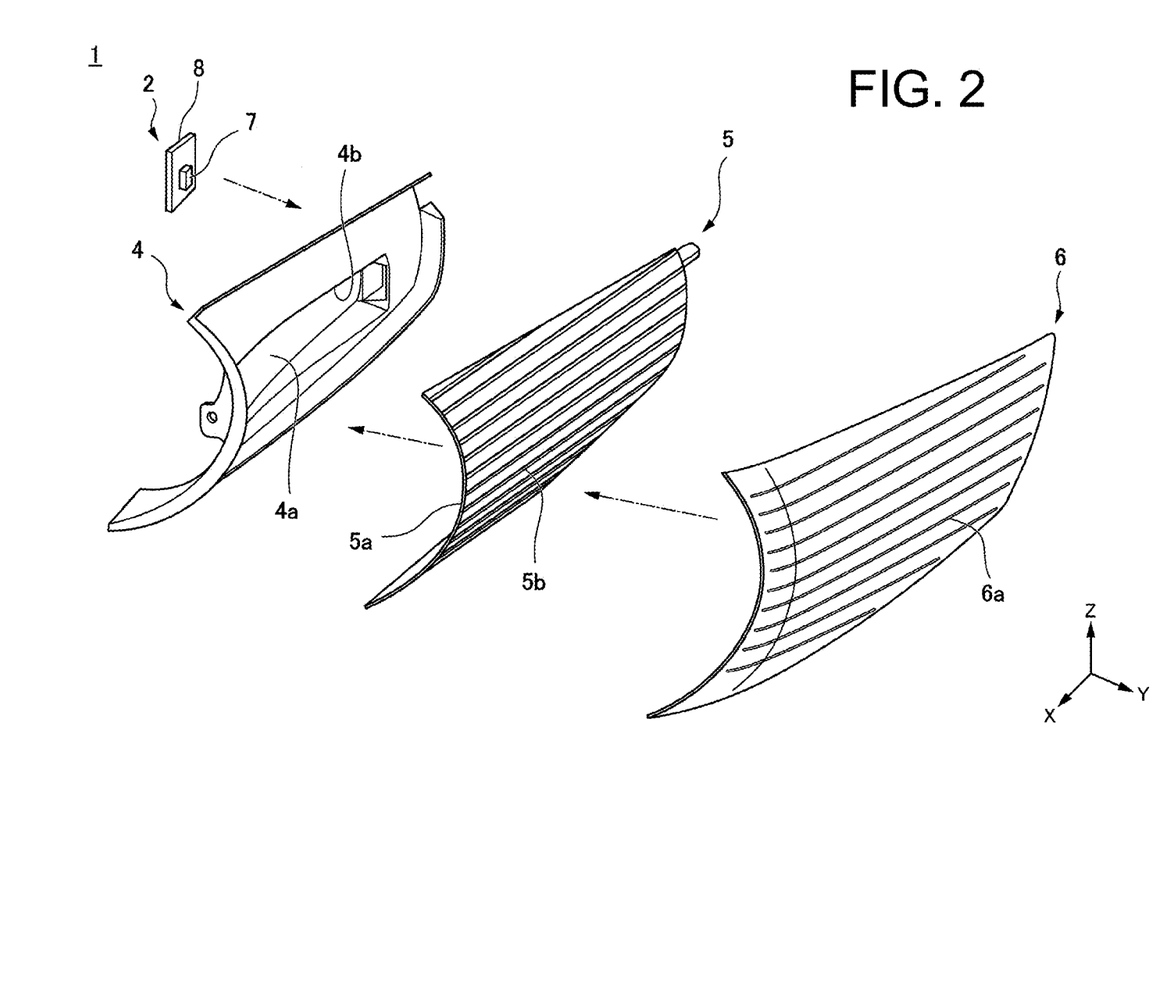
FIG. 2 is an exploded perspective view showing the configuration of the vehicular lamp shown in FIG. 1.
Figure 3:
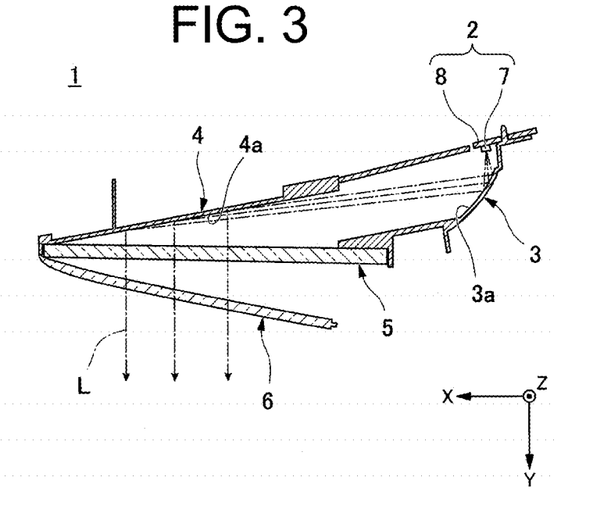
FIG. 3 is a horizontal cross-sectional view showing the configuration of the vehicular lamp shown in FIG. 1.
Figure 4:
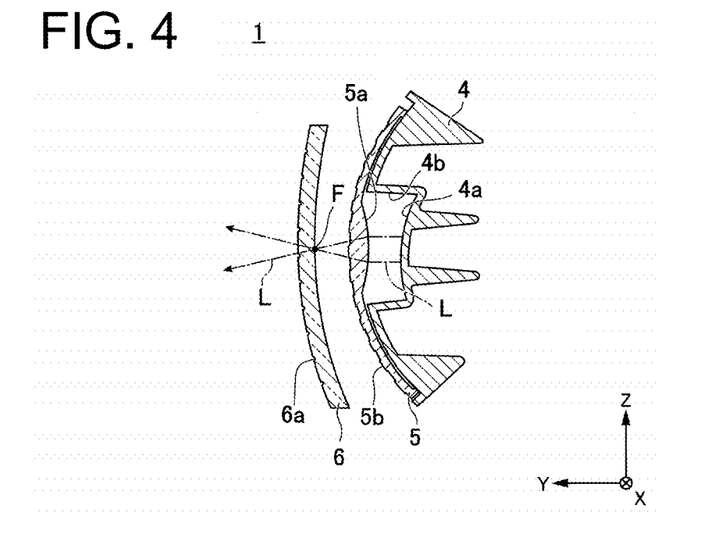
FIG. 4 is a vertical cross-sectional view showing the configuration of the vehicular lamp shown in FIG. 1.
Figure 5A:
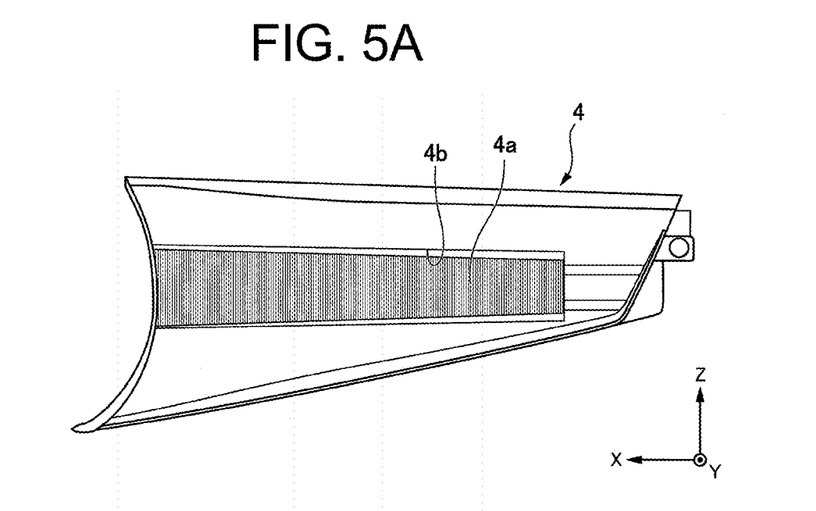
FIGS. 5A and 5B illustrate the configuration of a reflector provided by the vehicular lamp shown in FIG. 1, wherein 5A is a front view thereof, and 5B is an enlarged cross-sectional view of an essential portion thereof.
Figure 5B:
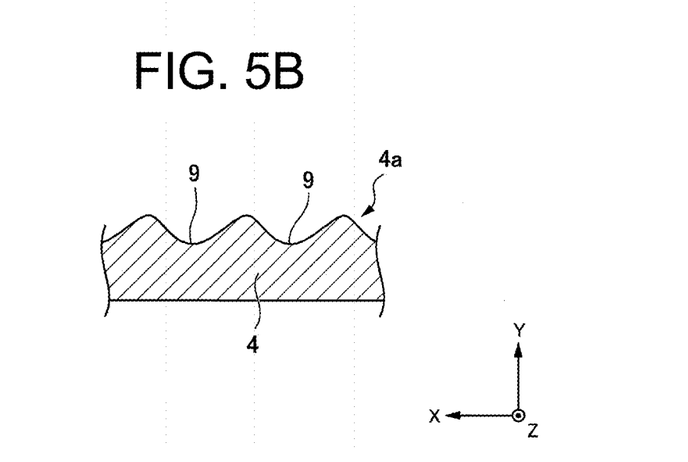
Figure 6:
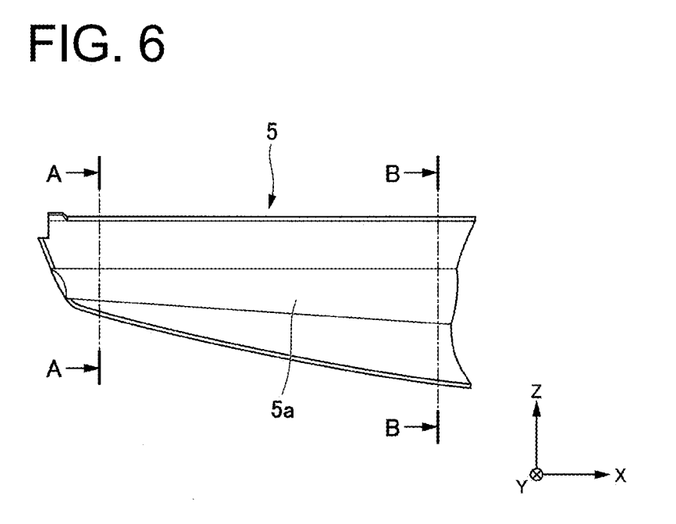
FIG. 6 is a plan view showing a configuration of an inner lens included in the vehicular lamp shown in FIG. 1.
Figure 7A:
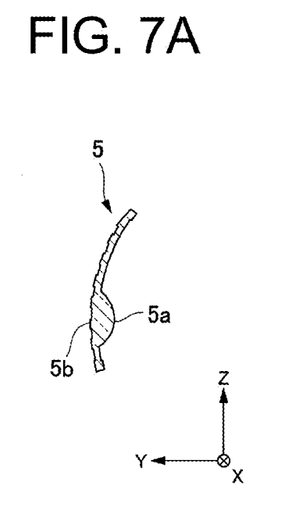
FIGS. 7A and 7B illustrate the configuration of the inner lens shown in FIG. 6, wherein 7A is a cross-sectional view taken along line A-A on the proximal end side (first end), and 7B is a cross-sectional view taken along line B-B on the distal end side (second)
Figure 7B:
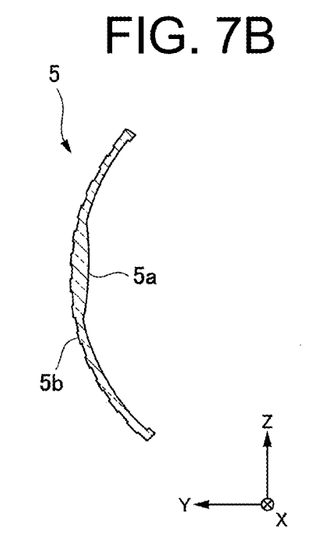
Figure 8:
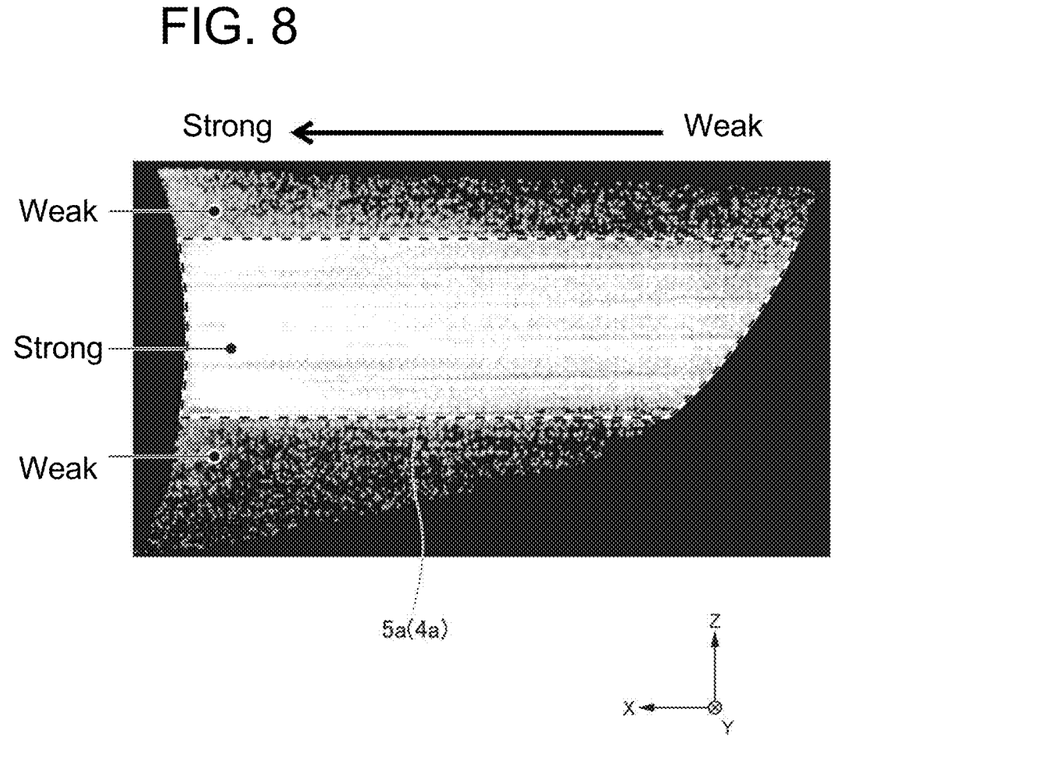
FIG. 8 is a photograph showing the light emission state of the vehicular lamp shown in FIG. 1.

As an embodiment of the presently disclosed subject matter, for example, a vehicular lamp 1 shown in FIGS. 1 to 8 will be described. FIG. 1 is a perspective view showing a configuration of a vehicular lamp according to an embodiment. FIG. 2 is an exploded perspective view showing the configuration of the vehicular lamp shown in FIG. 1. FIG. 3 is a horizontal cross-sectional view showing the configuration of the vehicular lamp shown in FIG. 1. FIG. 4 is a vertical cross-sectional view showing the configuration of the vehicular lamp shown in FIG. 1. FIGS. 5A and 5B illustrate the configuration of a reflector provided by the vehicular lamp shown in FIG. 1, wherein 5A is a front view thereof, and 5B is an enlarged cross-sectional view of an essential portion thereof. FIG. 6 is a plan view showing a configuration of an inner lens included in the vehicular lamp shown in FIG. 1. FIGS. 7A and 7B illustrate the configuration of the inner lens shown in FIG. 6, wherein 7A is a cross-sectional view taken along line A-A on the proximal end side, and 7B is a cross-sectional view taken along line B-B on the distal end side; and FIG. 8 is a photograph showing the light emission state of the vehicular lamp shown in FIG. 1.

In the accompanying drawings, the XYZ orthogonal coordinate system is set, and the X-axis direction is indicated as the front-rear direction (lengthwise direction) of the vehicular lamp 1, the Y-axis direction is indicated as the left-right direction (width direction) of the vehicular lamp 1, and the Z-axis direction is indicated as the vertical direction (height direction) of the vehicular lamp 1.

The vehicular lamp 1 of the present exemplary embodiment is, for example, a rear combination lamp mounted on both corner portions on the rear end side (corner portions on the right rear end side in the present exemplary embodiment) of a vehicle (not shown) to which the presently disclosed subject matter is applied.

In the following description, "front", "rear", "left", "right", "upper" and "lower" mean directions when the vehicle lamp 1 is viewed from the front (rear of the vehicle) unless otherwise specified. Therefore, the front, rear, left, and right directions are reversed from the respective directions when the vehicle itself is viewed from the front.

As shown in FIG. 1, the vehicular lamp 1 of the present exemplary embodiment has a structure in which a lamp that simultaneously serves as a tail lamp (TLL) and a brake lamp (BRL) and emits red light toward the rear of the vehicle, a turn signal lamp (TRL) that emits umber light (or orange light) toward the rear of the vehicle, and a tail lamp (TLL) that emits red light toward the side of the vehicle are disposed inside a lamp body (not shown) that constitutes the vehicular lamp 1.

The vehicular lamp 1 of the present exemplary embodiment is characterized in that, in a tail lamp (TLL) that emits red light toward the side of the vehicle, a flow of light (streamlined light emission) that emits light in a linear shape (line shape) is produced. Therefore, in the vehicular lamp 1 of the present exemplary embodiment, the configuration of the tail lamp TLL that emits red light toward the side of the vehicle will be described in detail with reference to FIGS. 2 to 7.

As shown in FIGS. 2, 3, and 4, the vehicular lamp 1 of the present exemplary embodiment includes a light source 2, a first reflector 3 configured to reflect light L emitted from the light source 2 toward the front side of the vehicle, a second reflector 4 configured to reflect light having been reflected by the first reflector 3 (light L emitted from the light source 2) toward the side of the vehicle (sideward), an inner lens 5 configured to allow light L reflected by the second reflector 4 to pass therethrough and be outputted toward the side of the vehicle, and an outer lens 6 configured to allow light L having passed through the inner lens 5 to be outputted toward the side of the vehicle.

The light source 2 includes an LED package 7 that includes an LED chip or the like that emits red light (light L). The LED package 7 is of a high-output type for vehicle illumination. The light source 2 has a structure in which the LED package 7 is mounted on the surface of a circuit board 8 provided with a driving circuit for driving the LED package 7, and emits light L radially toward the side of the vehicle.

In the light source 2, a substrate (mounting substrate) on which the LED package 7 is mounted and a substrate (circuit substrate) on which a driving circuit for driving the LED package 7 is provided may be separately arranged, and the mounting substrate and the circuit substrate may be electrically connected via a wiring code called a harness to protect the driving circuit from heat generated by the LED package 7.

The first reflector 3 has a first reflecting surface 3a that is concavely curved so as to draw a parabola with a focal point at or near the LED package 7 (light emitting point). As a result, the first reflector 3 reflects the light L emitted from the light source 2 (LED package 7) while collimating the light L toward the front side of the vehicle by the first reflecting surface 3a.

The second reflector 4 has a curved shape extending in a front-rear direction while convexly curved toward the side (outer side) opposite the inner lens 5 in the vertical direction, as shown in FIGS. 2 to 4 and 5A and 5B. The second reflector 4 has a second reflecting surface 4a in which a plurality of reflection cuts 9 are periodically arranged in the front-rear directions. The second reflecting surface 4a is located between the upper end and the lower end of the second reflector 4, and is provided inside the concave portion 4b formed in a rectangular shape in a plan view.

The second reflecting surface 4a is provided so as to extend in the front-rear direction while being curved convexly toward the side facing the inner lens 5 (facing the inner side thereof) in the vertical direction. The second reflecting surface 4a is provided so as to be inclined toward the side facing the inner lens 5 in the front-rear direction thereof. Further, the radius of curvature of the second reflecting surface 4a in the vertical direction is set so as to reflect the light L entering the second reflecting surface 4a while collimating the light L in the vertical direction.

The plurality of reflection cuts 9 are formed by periodically arranging groove portions cut in the vertical direction in the front-rear direction on the second reflecting surface 4a. The groove portion has a curved surface shape curved concavely in the width direction. As a result, the plurality of reflection cuts 9 reflect the light L incident on the groove portions toward the side of the vehicle while diffusing the light L in the front-rear direction.

As shown in FIGS. 2 to 4, 6, and 7A, and 7B, the inner lens 5 has a curved shape extending in the front-rear direction while curved convexly toward the side opposite to the side facing the second reflector 4 (outer side) in the vertical direction. The inner lens 5 may be made of a material having a refractive index higher than that of air, such as a transparent resin including a polycarbonate resin or acrylic resin, or glass. The inner lens 5 is also configured as a colorless (clear) lens.

The inner lens 5 has a lens surface 5a protruded from a surface (inner surface) facing the second reflector 4 so as to face the second reflecting surface 4a. That is, the lens surface 5a is positioned between the upper end and the lower end of the inner lens 5, and is formed in a rectangular shape so as to overlap the concave portion 4b in a plan view.

The lens surface 5a is convexly curved in the vertical direction and has a cylindrical shape extended in the front-rear direction. The radius of curvature of the lens surface 5a in the vertical direction is set so that the light L incident on the lens surface 5a is condensed in the vertical direction and then diffused in the vertical direction. That is, the focusing point F of the light L condensed by the lens surface 5a is located on the surface (inner surface) of the outer lens 6 closer to the inner lens 5 than the surface (outer side) which is the side opposite to the side facing the inner lens 5.

The radius of curvature of the lens surface 5a in the vertical directions gradually increases from the proximal end side (first end side close to the light source) to the distal end side (second end side away from the light source) of the lens surface 5a. As a result, the degree of diffusion of the light L diffused vertically by the lens surface 5a gradually decreases from the proximal end side to the distal end side of the lens surface 5a.

The inner surface of the inner lens 5 facing the second reflector 4 is subjected to a grain finishing process. As a result, the light L incident on the inner surface of the inner lens 5 is weakly scattered. On the other hand, a plurality of convex portions 5b protrude from the surface (outer surface) of the inner lens 5 facing the outer lens 6. The plurality of convex portions 5b have shapes extending linearly in the front-rear direction of the inner lens 5, and are arranged in the vertical direction of the inner lens 5 at regular intervals.

As shown in FIGS. 1 and 2, the outer lens 6 has a shape extending in the front-rear direction thereof while being curved convexly toward the side (outer side) opposite to the side facing the inner lens 5 in the vertical direction. The outer lens 6 is provided so as to be inclined toward the side facing the inner lens 5 in the front-rear direction. The outer lens 6 may be made of a material having a refractive index higher than that of air, such as a transparent resin including a polycarbonate resin or an acrylic resin, or glass. The outer lens 6 is configured as a colorless (clear) lens.

A plurality of groove portions 6a are provided on the surface (outer surface) of the outer lens 6 on the side opposite to the side facing the inner lens 5. The plurality of groove portions 6a are provided so as to extend linearly in the front-rear direction of the outer lens 6, and are arranged at regular intervals in the vertical direction of the outer lens 6. The convex portion 5b on the inner lens 5 side and the groove portion 6a on the outer lens 6 side are provided as decorative portions for producing a flow (streamlined light emission) of light L emitted in a linear (linear) shape. On the other hand, the surface (inner surface) of the outer lens 6 facing the inner lens 5 is formed of a smooth curved surface.

In the vehicular lamp 1 of the present exemplary embodiment having the above-described configuration, it is possible to produce a flow (streamlined light emission) of the light L emitted linearly by the light L projected toward the side of the vehicle as a tail lamp (TLL) projecting red light toward the side of the vehicle.

Specifically, in the vehicular lamp 1 of the present exemplary embodiment, as shown in FIG. 8, the light L entering from the above-mentioned lens surface 5a is condensed in the vertical direction and then diffused in the vertical direction, whereby the light emission of the central portion corresponding to the lens surface 5a (second reflecting surface 4a) can be made relatively strong, and the light emission on the upper side and the lower side sandwiching the central portion can be made relatively weak.

Further, in the vehicular lamp 1 of the present exemplary embodiment, the degree of diffusion of the light L diffused in the vertical direction by the lens surface 5a gradually decreases from the proximal end side to the distal end side of the above-described lens surface 5a, whereby the light emission on the distal end side of the part corresponding to the lens surface 5a (second reflecting surface 4a) can be made relatively strong and the light emission on the proximal end side can be made relatively weak.

As a result, in the vehicular lamp 1 of the present exemplary embodiment, it is possible to further emphasize the flow (streamlined light emission) of the light L emitted linearly (linearly). Further, in the vehicular lamp 1 of the present exemplary embodiment, it is possible to produce a flow (streamlined light emission) of the light L emitted linearly (linearly) without depending on the angle at which the vehicular lamp 1 is viewed.

In the vehicular lamp 1 of the present exemplary embodiment, by using the above-mentioned colorless (clear) outer lens 6 and inner lens 5, it is possible to obtain a light source image in which the second reflector 4 inside the outer lens 6 and the inner lens 5 emits red light. As a result, it is possible to produce a sense of depth with respect to the flow (streamlined light emission) of the light L emitted in a linear (linear) shape. Further, in the vehicular lamp 1, since the outer lens 6 is inclined toward the side facing the inner lens 5 in the front-rear direction, the sense of depth can be further emphasized.

As described above, in the vehicular lamp 1 of the present exemplary embodiment, the light L emitted toward the side of the vehicle makes it possible to produce the flow of the light L emitted linearly, and it is possible to obtain the light with a good appearance.

The present invention is not necessarily limited to the exemplary embodiments described above, and various modifications can be made thereto without departing from the spirit of the presently disclosed subject matter.

For example, in the exemplary embodiments described above, the case where the presently disclosed subject matter is applied to the rear combination lamp described above has been exemplified, but in the case of configuring the rear combination lamp, it is possible to combine the rear combination lamp with other members such as an extension and a bracket, for example, in addition to the configuration described above.

Further, in the exemplary embodiments described above, the case where the presently disclosed subject matter is applied to the rear combination lamp has been exemplified, but the presently disclosed subject matter can also be applied not only to the rear side vehicular lamp described above, but also to a front side vehicular lamp such as a vehicle headlamp, for example.

Specifically, the vehicular lamp to which the presently disclosed subject matter is applied is not limited to the tail lamp (TLL) described above, and the presently disclosed subject matter can be suitably used for a vehicular lamp that produces a flow of light (streamlined light) that emits light linearly by light emitted toward the side of the vehicle, for example, a daytime lighting lamp (DRL), a direction indicator (turn signal lamp), a vehicle width lamp (position lamp), or the like.

The light source 2 may be any light emitting device as long as it emits light L radially, and a light emitting device such as a laser diode LD can be used in addition to the LED package 7. Further, the number of the light sources 2 is not limited to one, and may be plural. Further, the color of the light emitted by the light source 2 is not limited to the above-described red light, and may be appropriately changed depending on the application thereof, such as white light or orange light It will be apparent to those skilled in the art that various modifications and variations can be made in the presently disclosed subject matter without departing from the spirit or scope of the presently disclosed subject matter. Thus, it is intended that the presently disclosed subject matter cover the modifications and variations of the presently disclosed subject matter provided they come within the scope of the appended claims and their equivalents. All related art references described above are hereby incorporated in their entirety by reference.

What is claimed is:

1. A vehicle light comprising:
    a light source configured to emit light;
    a reflector configured to extend in a lateral direction of a vehicle and reflect the light emitted from the light source toward a side of the vehicle; and
    an inner lens configured to extend in the lateral direction of the vehicle and allow the light reflected by the reflector to be projected toward the side of the vehicle, wherein
    the reflector has a reflecting surface on which a plurality of reflection cuts are periodically arranged in the lateral direction,
    the inner lens has a lens surface facing the reflector, so that a part of the surface facing the reflector so serves as a lens surface protruded toward the reflecting surface,
    the lens surface has a shape extending in the lateral direction while being curved convexly in a direction facing the reflector, and having a first end near the light source in the lateral direction and a second end spaced from the light source in the lateral direction, and
    a radius of curvature of the curved convex shape of the lens surface gradually increases from the first end to the second end of the lens surface such that at least a portion of the curved convex shape forms a partial conical surface extending along the lateral direction.

2. The vehicular lamp according to claim 1, wherein the radius of curvature of the lens surface in the vertical direction is set so that the light incident from the lens surface is condensed in the vertical direction and then diffused in the vertical direction.

3. The vehicular lamp according to claim 1, wherein a degree of diffusion of light diffused in the vertical direction by the lens surface gradually decreases from the first end side to the second end side of the lens surface.

4. The vehicular lamp according to claim 2, wherein a degree of diffusion of light diffused in the vertical direction by the lens surface gradually decreases from the first end side to the second end side of the lens surface.

5. The vehicular lamp according to claim 1, wherein
    the inner lens is configured so as to be curved convexly toward the side opposite to the side facing the reflector, and
    the lens surface is provided between an upper end and a lower end of the inner lens.

6. The vehicular lamp according to claim 2, wherein
    the inner lens is configured so as to be curved convexly toward the side opposite to the side facing the reflector, and
    the lens surface is provided between an upper end and a lower end of the inner lens.

7. The vehicular lamp according to claim 3, wherein
    the inner lens is configured so as to be curved convexly toward the side opposite to the side facing the reflector, and
    the lens surface is provided between an upper end and a lower end of the inner lens.

8. The vehicular lamp according to claim 4, wherein
    the inner lens is configured so as to be curved convexly toward the side opposite to the side facing the reflector, and
    the lens surface is provided between an upper end and a lower end of the inner lens.

9. The vehicular lamp according to claim 1, wherein the reflecting surface is curved convexly toward the inner lens.

10. The vehicular lamp according to claim 2, wherein the reflecting surface is curved convexly toward the inner lens.

11. The vehicular lamp according to claim 3, wherein the reflecting surface is curved convexly toward the inner lens.

12. The vehicular lamp according to claim 5, wherein the reflecting surface is curved convexly toward the inner lens.

13. The vehicular lamp according to claim 9, wherein the radius of curvature of the reflecting surface is set so as to reflect light incident on the reflecting surface while collimating the light in the vertical direction.

14. The vehicular lamp according to claim 10, wherein the radius of curvature of the reflecting surface is set so as to reflect light incident on the reflecting surface while collimating the light in the vertical direction.

15. The vehicular lamp according to claim 11, wherein the radius of curvature of the reflecting surface is set so as to reflect light incident on the reflecting surface while collimating the light in the vertical direction.

16. The vehicular lamp according to claim 12, wherein the radius of curvature of the reflecting surface is set so as to reflect light incident on the reflecting surface while collimating the light in the vertical direction.

17. The vehicular lamp according to claim 1, comprising an outer lens configured to allow light to be projected from the inner lens toward the side of the vehicle, and wherein a condensing point of light condensed by the lens surface is located on the inner lens side of a surface of the outer lens opposite to the inner lens side.

18. The vehicular lamp according to claim 2, comprising an outer lens configured to allow light to be projected from the inner lens toward the side of the vehicle, and wherein
a condensing point of light condensed by the lens surface is located on the inner lens side of a surface of the outer lens opposite to the inner lens side.

19. The vehicular lamp according to claim 3, comprising an outer lens configured to allow light to be projected from the inner lens toward the side of the vehicle, and wherein
a condensing point of light condensed by the lens surface is located on the inner lens side of a surface of the outer lens opposite to the inner lens side.

20. The vehicular lamp according to claim 17, wherein the outer lens is provided so as to be curved convexly toward the side opposite to the side facing the inner lens.

\* \* \* \* \*